June 23, 1964
G. N. TYSON, JR
3,137,993
METHOD FOR PRODUCING LARGE VOLUMES OF GASES
IN SHORT PERIODS OF TIME
Filed Nov. 25, 1958
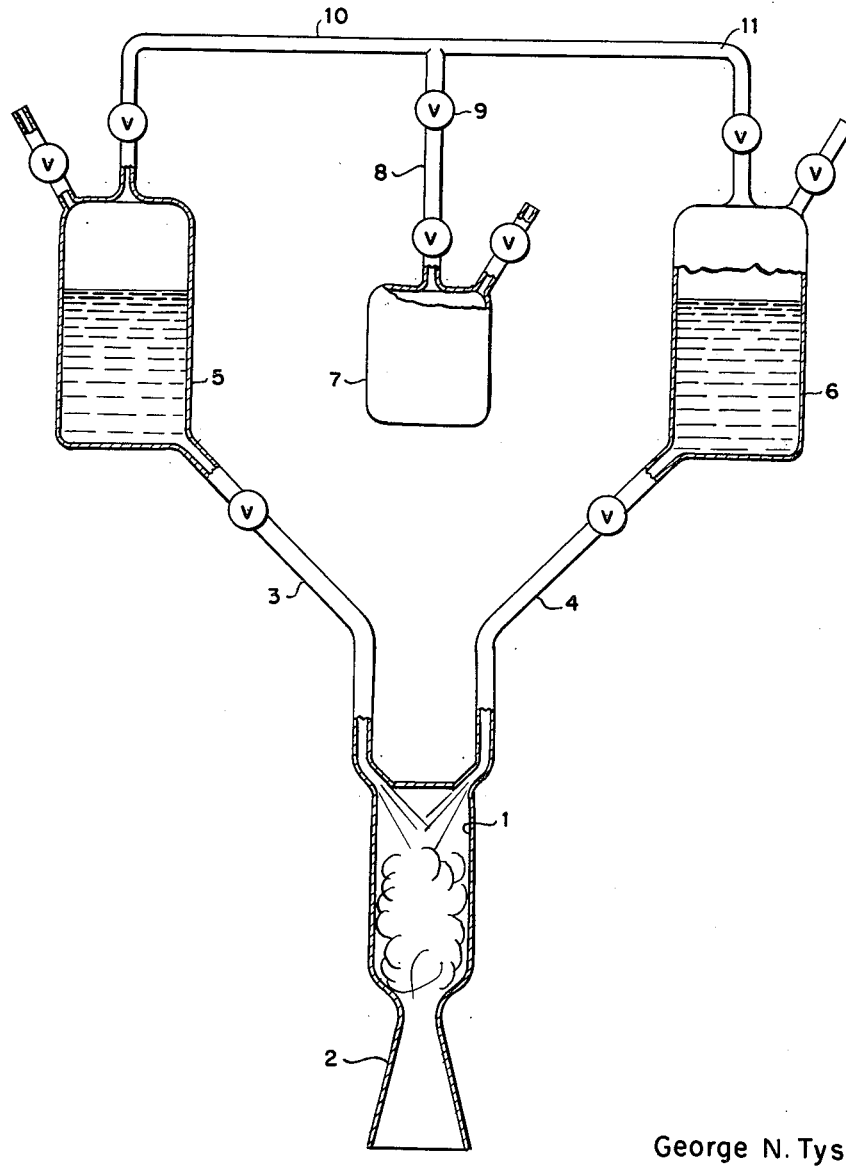
George N. Tyson Jr.
INVENTOR.
BY
Adams, Forward and McLean
ATTORNEYS 3,137,993
METHOD FOR PRODUCING LARGE VOLUMES OF
GASES IN SHORT PERIODS OF TIME
George N. Tyson, Jr., Claremont, Calif., assignor to Olin
Mathieson Chemical Corporation, a corporation of
Virginia
Filed Nov. 25, 1958, Ser. No. 776,385
12 Claims. (Cl. 60—35.4)

This invention relates to a method for producing large volumes of hot gases in a short period of time, which large volumes of hot gases are useful for many purposes including imparting thrust to jet propelled devices such as rockets.

Jet propelled devices are essentially of two types: those which depend upon an external source for a portion of the propellant, and those in which the propellant is entirely contained within the device. Such latter devices are conventionally called pure rockets. This invention will be further described in relation to pure rockets and their operation.

One of the most important characteristics of a rocket propellant system is its performance index or specific impulse. This is the amount of thrust in pounds that can be obtained per pound of propellant consumed per second. Since the aim is to get as much thrust as possible per pound of propellant burned, a high value for the specific impulse is desirable.

Rocket propellants can be in the form of solids or in the form of liquids. Propellants consisting of a single liquid are termed monopropellants and include hydrogen peroxide and nitromethane. Propellants involving two liquids are termed bipropellants and normally consist of a fuel, such as a hydrocarbon, ethyl alcohol-water or ammonia and an oxidizer such as hydrogen peroxide or liquid oxygen. Other oxidizer fuel combinations include nitric acid with aniline or furfuryl alcohol. These latter combinations are termed hypergolic bipropellants since they react spontaneously upon admixture.

Hydrazine has also been used as a fuel component in bipropellant systems in combination with oxidizers such as liquid oxygen, hydrogen peroxide, white or red fuming nitric acid, or liquid fluorine. It is spontaneously inflammable with nitric acid and with fluorine. The specific impulse of hydrazine when burned with liquid oxygen varies from 257 to 264 pound-seconds per pound at 300 p.s.i.a. for various fuel-oxygen ratios, the value being higher in the presence of excess fuel, and when fluorine is used as the oxidizer, the specific impulse at 300 p.s.i.a. is about 298 pound-seconds per pound.

It has been proposed to employ the boron hydrides including diborane, tetraborane and the pentaboranes as fuel components in bipropellant systems wherein liquid oxygen is the oxidizer. Such systems supply high calculated specific impulses of about 290 pound-seconds per pound at 300 p.s.i.a.

Both hydrazine and the boron hydrides are strong reducing agents, reacting vigorously with a variety of oxidizers. It has now been discovered that, surprisingly, hydrazine reacts spontaneously with certain of the boron hydrides. Moreover, it has been found that the reaction produces a very high specific impulse, of the order of 300 pound-seconds per pound at 300 p.s.i.a.

Thus large volumes of hot gases are produced according to the present invention by contacting hydrazine with a borane having a boiling point at atmospheric pressure up to about 65° C. Such boranes include diborane, tetraborane, pentaborane-9 ($B_5H_9$) and dihydropentaborane ($B_5H_{11}$). The hydrazine can be anhydrous or it can be in admixture with water up to about 50 mole percent of water, for example, the azeotrope of hydrazine and water which contains 41.5 mole percent of water.

The hydrazine and boranes react spontaneously to produce very finely divided solid boron nitride and large volumes of hydrogen gas, generally according to the following equations:

$$N_2H_4 + B_2H_6 \rightarrow 2BN + 5H_2$$
$$2N_2H_4 + B_4H_{10} \rightarrow 4BN + 9H_2$$
$$2.5N_2H_4 + B_5H_9 \rightarrow 5BN + 9.5H_2$$
$$2.5N_2H_4 + B_5H_{11} \rightarrow 5BN + 10.5H_2$$

In addition to the extremely high specific impulses produced by the above reactions when hydrazine and the boranes are employed as bipropellants for rockets, the use of hydrazine and one or a mixture of the pentaboranes as a bipropellant is especially advantageous since both of the fuel components are normally liquid. Moreover, tetraborane, which boils at 16° C., can be easily liquified, and diborane, which boils at —92.5° C. is much more easily liquified than, for example, oxygen.

The operation of a rocket engine employing a bipropellant consisting of hydrazine and pentaborane-9 will be described with reference to the accompanying drawing, which depicts schematically a conventional rocket engine.

In the drawing, numeral 1 represents the reaction chamber and numeral 2 the nozzle of the rocket engine. Chamber 2 is connected by valved lines 3 and 4 to vented tanks 5 and 6 respectively which contain the hydrazine and borane propellants. Tank 7 contains, for example, a compressed inert gas such as nitrogen and is connected by line 8, containing pressure regulator 9, and branched valved lines 10 and 11 respectively to tanks 5 and 6. Reaction chamber 1 is generally quite small in comparison with the size of the propellant tanks 5 and 6. The pressure in reaction chamber 1 during the reaction can be controlled by the rate of addition of the propellants and is generally in the range of 300–1000 p.s.i.a. The propellants are forced into reaction chamber 1 against this pressure and the compressed inert gas from tank 7 is employed to apply pressure to tanks 5 and 6. Instead of a compressed inert gas, pumps can be used for this purpose and on larger devices turbopumps can be employed driven by turbines supplied with hot gases from a separate gas generator.

The propellants enter reaction chamber 1 through an injector which can be of the impinging stream, multiple hole type, with or without a splash plate, or of the spray type. In the former, the propellants are separately injected through a number of separate holes in such a manner that the resulting propellant streams intersect each other and both will break up into small droplets. Spray type injectors give conical, cylindrical, or other types of spray sheets of propellant fluids, which intersect and thereby atomize and mix.

The hydrazine-borane bipropellant system is hypergolic so that igniting means are not required. To facilitate start-up, however, a glow plug, spark plug or flame lance can be provided. Since it is almost impossible to synchronize exactly the propellant feeds of a bipropellant system when starting the rocket engine, the hydrazine flow is advantageously first initiated. The propellant valves can be controlled to operate in sequence and only partially opened until reaction is established at which times they are fully opened. After start-up, the flow ratio of hydrazine to borane is adjusted to be approximately stoichiometric for the reaction of all of the boron in the borane with all of the nitrogen in the hydrazine to form boron nitride, BN.

Liquid propellants mostly are reacted in the temperature range of 2000° F. to 4500° F. at pressures between 300 and 1500 p.s.i.a. The reaction pressure, as stated previously, can be controlled by the rate of flow of the propellants. One of the advantages of the hydrazine-borane bipropellant system is the relatively low temperature of the reaction of the order of about 3600° F. For rocket engines designed for relatively long periods of sustained operating duration, the engine can be cooled, for example by a regenerative cooling system using water or another relatively inert fluid as the coolant flowing through a jacket surrounding the reaction chamber.

I claim:

1. A method for producing large volumes of hot gases which comprises reacting a mixture consisting essentially of liquid hydrazine with a boron hydride in liquid phase having a boiling point at atmospheric pressure up to about 65° C. in a reaction zone in proportions such that boron nitride, BN, is formed.

2. The method of claim 1 wherein the boron hydride is diborane.

3. The method of claim 1 wherein the boron hydride is tetraborane.

4. The method of claim 1 wherein the boron hydride is pentaborane-9.

5. A method of operating a jet propelled device which comprises separately supplying to the reaction chamber of the device liquid hydrazine and a boron hydride having a boiling point at atmospheric pressure up to about 65° C. in liquid phase to provide a reaction mixture consisting essentially of hydrazine and boron hydride, reacting the hydrazine with the boron hydride in a ratio approximately stoichiometric for the reaction of all of the boron in the boron hydride with all of the nitrogen in the hydrazine to form boron nitride, BN, and exhausting the resulting gases from said device so as to impart thrust thereto.

6. The method of claim 5 wherein the boron hydride is diborane.

7. The method of claim 5 wherein the boron hydride is tetraborane.

8. The method of claim 5 wherein the boron hydride is pentaborane-9.

9. A method for producing immediate thrust to a rocket which comprises introducing a liquid bipropellant consisting essentially of hydrazine and a boron hydride having a normal boiling point up to about 65° C. into the rocket in contact with each other in a reaction zone therein in proportions so that spontaneous reaction is effected, and reacting the bipropellant in the reaction zone.

10. The method of claim 9 wherein the boron hydride is diborane.

11. The method of claim 9 wherein the boron hydride is tetraborane.

12. The method of claim 9 wherein the boron hydride is pentaborane-9.

References Cited in the file of this patent

UNITED STATES PATENTS 2,744,380  McMillan et al. _____ May 8, 1956

OTHER REFERENCES

Clark, "Ordnance," vol. 36, No. 190, Jan.-Feb., 1952, p. 662.

Steindler et al., "Journal of American Chemical Society," vol. 75, Feb. 5, 1953, p. 756.

Noland, "Chemical Engineering," vol. 65, No. 10, May 1958, pp. 150, 156.